Sept. 15, 1936.  G. H. HUFFERD  2,054,082
JOINT AND PROCESS OF MAKING SAME
Filed Feb. 26, 1934
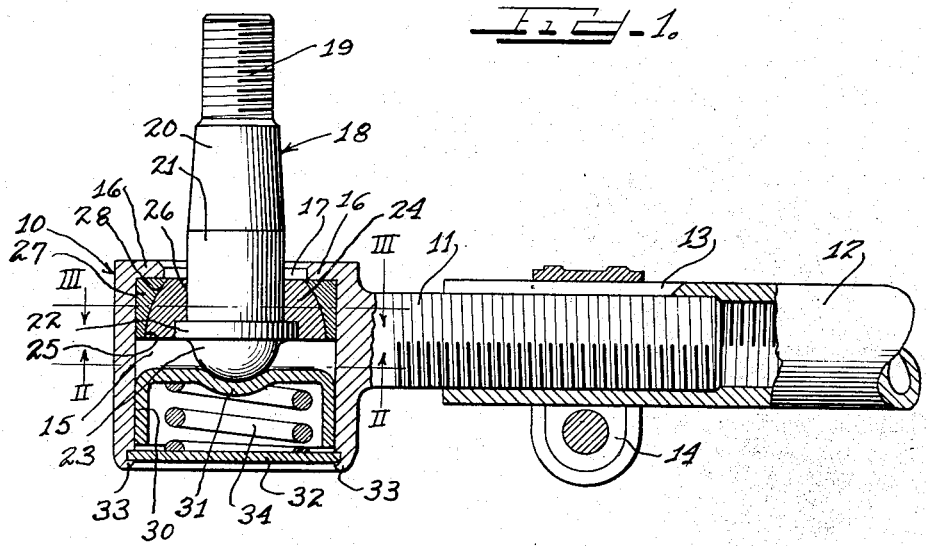
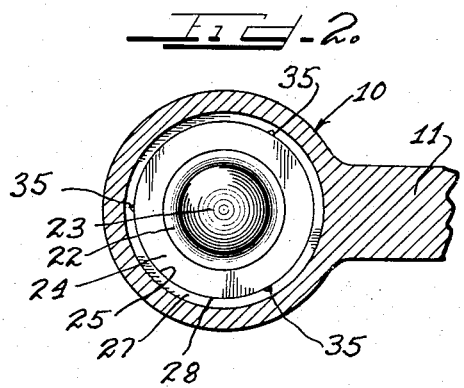
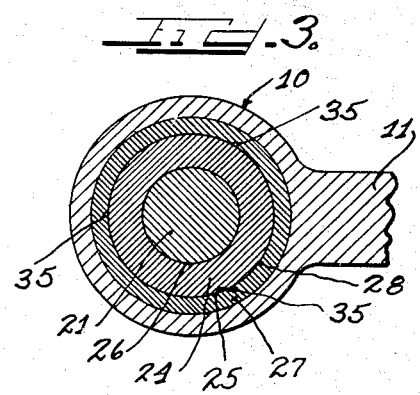
Inventor
George H. Hufferd.
by Charles H. Liell Attys.

Patented Sept. 15, 1936

2,054,082

UNITED STATES PATENT OFFICE 2,054,082

JOINT AND PROCESS OF MAKING SAME

George H. Hufferd, Detroit, Mich., assignor to Thompson Products Incorporated, Cleveland, Ohio, a corporation of Ohio Application February 26, 1934, Serial No. 712,905

12 Claims. (Cl. 29—152)

This invention relates to joints such as are used extensively on automobile tie rods, and having improved wearing qualities.

More specifically, this invention relates to joints having elements formed from specially treated metals to improve the wearing qualities of the assembled joints, and also includes a novel method of making said joints.

The constituent elements of the rod joints are subjected during use to both severe mechanical stress and to frictional wear. Some elements of the joints are subjected more to stress than they are to wear, while other parts are subjected more to wear than they are to stress. It is the purpose of this invention to form joints in which the elements subjected mostly to wear are formed of hardened metals while the elements subjected mostly to stress are formed of less hard but tougher metals. The tie rod joints of the prior art have been formed with stud elements having integrally formed bearing surfaces thereon, so that it has heretofore been impossible to prepare a stud element having both the desired toughness to resist severe stress and the desired hardness to resist wear of the bearing surface thereon. According to this invention the bearing surfaces are formed separately from the stud so that they may be hardened as much as desired without affecting the toughness of the stud metal.

Therefore the joints of this invention are formed with stud elements having the desired toughness properties and with bearing elements having the desired hardness properties. The co-operating bearing surfaces are lapped together to provide an accurate bearing fit and to prevent any "chugging" action between the surfaces during use. This "chugging" action is caused by uneven bearing surfaces and rapidly increases the clearances between these surfaces to quickly render the joint unfit for further use.

It is therefore an object of this invention to provide a joint having a stud element composed of a tough, stress resisting metal and having bearing surfaces composed of hardened, wear resisting metals.

Another object of this invention is to provide a joint having a seat element of hardened steel integrally associated with a stud element formed from a tough but less hardened steel.

Another important object of this invention is to provide a tie rod joint having interfitting seat members of hardened steel which have been lapped into a true surface bearing fit.

Another object of this invention is to provide a process of making tie rod joints which insures a true bearing relationship between the bearing seat elements.

Another object of this invention is to provide a process of forming joints having stud elements and seat elements composed of different heat treated metals.

Other and further objects of this invention will be apparent to those skilled in the art from the following detailed description of the accompanying sheet of drawing illustrating a preferred embodiment of this invention.

On the drawing:

Figure 1 is a cross-sectional view, with parts in elevation, of a tie rod joint according to this invention.

Figure 2 is a cross-sectional view, with parts in elevation, taken substantially along the line II—II of Figure 1.

Figure 3 is a cross-sectional view taken substantially along the line III—III of Figure 1.

As shown on the drawing, the reference numeral 10 indicates generally the casing or housing member of the joint. The casing has a laterally extending shank portion 11 threaded into a tie rod or other link connection 12.

The link 12 is preferably slotted as at 13 to permit a tightening of the rod on the shank 11 by a clamp 14 to prevent relative movement between the shank 11 and the rod 12 after they have been assembled in the proper threaded adjustment.

The housing 10 has an opening 15 of uniform diameter extending therethrough with the axis thereof perpendicular to the axis of the shank 11. The upper end of the housing 10 is provided with an inturned flange 16 which defines an annular opening 17 of smaller diameter than the opening 15 in the housing.

A stud 18 extends freely through the annular opening 17 in spaced relation therefrom.

The stud 18 is composed of a threaded portion 19 for receiving a locking nut (not shown), a tapered portion 20 for receiving the end of a link connection (not shown), a cylindrical bearing portion 21 extending into the housing, an integral, radially extending flange 22 and a rounded segmental spherical end 23.

A seating element 24 is provided for assembly on the stud 18. Said element 24 has an outside segmental spherical bearing surface 25 and a countersunk bore 26 extending through the center thereof. Said countersunk bore 26 is adapted to receive the cylindrical portion 21 and radial flange 22 of the stud 18 therein, and is pressed onto the stud to form a unitary member.

A second seating element 27 is pressed into the housing 10 against the inturned flanges 16. The seating element 27 has a segmental spherical inside bearing surface 28 for cooperating with the bearing surface 25 of the seating element 24.

A dished cap 30 having a spherical, depressed portion 31 is adapted to be inserted in the open end of the housing 15 and is slidable along the inner walls of the housing. A cover plate 32 is placed over the dished cap 30 and the housing is peened as shown at 33 to hold the cover 32 in the end of the housing.

A coiled spring 34 is held under compression between the cap 30 and the cover 32 for urging the depressed portion 31 of the cap 30 against the rounded end 23 of the stud member 18. The stud member 18 and seat element 24 are thus held in operative position with the portions 19 and 20 of the stud extending freely from the housing 10.

Lubricant channels or grooves 35 are cut into the seating element 27 in the spherical bearing surface 28 thereof for supplying lubricant to the cooperating bearing surfaces 25 and 28. It is obvious that any number of lubricant passageways or channels 35 may be used and that three such channels are shown in Figures 2 and 3 for purposes of illustration only. The lubricant channels could also be cut into the seat element 24 in the bearing surface 25 thereof without departing from the principle of this invention.

The structure of the joints of this invention makes possible the use of metals possessing the desired properties in the various parts of the joint. Thus the stud element 18 may be composed of a steel that has been specially heat treated for toughness. Since no part of the stud element must act as a bearing surface, it is not necessary to use the somewhat brittle hardened metals that were heretofore used in forming stud elements. The rounded end portion 23 of the stud 18 may be case hardened, if desired, to impart wear resisting properties thereto. However, the case hardening of this end does not embrittle the remaining portion of the stud or render it less resistant to impact stresses.

The seat elements may be formed of specially treated case hardened metal so that the cooperating bearing surfaces resist wear. According to this invention the seat element 24 is lapped into a true surface bearing fit with the seat element 27 which is pressed into the housing 10.

The joints of this invention may be formed according to the following process:

The stud 18 is formed of a tough steel and machined as shown in Figure 1 with an annular flange 22 and a rounded end portion 23. The rounded end portion is case hardened according to well known forging processes. The stud 18 is next pressed into the seating element 24 to provide a unitary structure. The seat element 24 and the stud 18 thereby become an integral member.

A case hardened seat member having an inside segmental spherical surface is pressed into the housing at 10 against the inturned flanges 16.

The stud 18 with the seat element 24 is then inserted in the housing and the seat elements are lapped together by grinding to provide a true bearing fit between their bearing surfaces 25 and 28.

The grease channels or grooves are then cut into either or both of the segmental spherical bearing surfaces on the seat element; the housing is next packed with grease; and the dished cap 30 inserted through the opening 15 against the rounded end portion of the stud element 31. The coiled spring 34 is placed in the cap 30 and compressed by the cover plate 32. The cover plate 32 is then seated into position by peening the end 33 of the housing member 10.

The joints of this invention are therefore readily formed by simple process steps and the resulting joint structure is capable of resisting both wear and mechanical stresses because the constituent parts thereof are specially treated to perform their respective functions. The elements of the joint which are subjected to direct shock during use are formed to give the best possible resistance to the type of stresses which they encounter, while each bearing surface of the joint is formed with the most satisfactory material for resisting frictional wear.

Having now described my invention, I am aware that many changes may be made and numerous details of construction may be varied through a wide range without departing from the principles of this invention, and I therefore do not purpose limiting the patent granted hereon otherwise than necessitated by the prior art.

I claim:

1. In a joint, a housing, a hardened spherical seat member pressed into said housing, a hardened spherical member in a true bearing fit with said first mentioned seat member, and a tough stud member extending axially through said second spherical member and permanently associated therewith, said tough stud member being less hard than the spherical members.

2. A joint comprising, a casing, a segmental spherical seat member pressed therein, a hardened segmental spherical seat member in true bearing relation with said first seat member, a stud member pressed into said second seat member and extending freely from the casing, a rounded end on said stud member, a cap member in said housing urged against said rounded end to hold the stud and seat element in assembled relation, and a cover plate secured in said housing for retaining said cap member.

3. A joint comprising a housing having an opening of uniform diameter extending therethrough, a flanged top on said housing defining an annular opening, a hardened seat member pressed in said housing against said flange having a segmental spherical inside bearing surface, a second hardened seat element having an outside spherical bearing surface in a true bearing fit with said first mentioned seat element, a stud pressed into said second seat element, and spring urged means for holding said stud in assembled relation.

4. In a joint, a housing, a hardened seat element pressed therein having an inside segmental spherical bearing surface, a stud, a seat member pressed around said stud having an outside segmental spherical surface in a true bearing fit with the bearing surface of said first mentioned seat element, and means for holding said elements in assembled relation in the housing.

5. In a joint, a stud formed of tough heat treated steel, and a hardened seat element pressed around said stud member to form a unitary part thereon.

6. In a joint, a housing, a hardened seat element pressed therein, a second hardened seat element in a true bearing fit with said first mentioned seat element, a stud pressed through said second seat element and extending from the housing, and grease channels in the bearing surface of one of said seat elements.

7. The process of making joints which comprises, pressing a seat element into a joint housing, pressing a stud member into a case hardened cooperating seat element, and lapping said last mentioned case hardened seat element into true bearing relationship with the first mentioned seat element.

8. A process of making joints, which comprises pressing a case hardened seat element into a joint housing, pressing a stud that has been heat treated for toughness into permanently assembled relation with a second case hardened seat element, and lapping said seat element into true bearing relation with said first mentioned seat element.

9. In the process of forming tie rod joints, the step which comprises pressing a stud into a case hardened seat element to form a unitary member.

10. The process of forming tie rod joints which comprises heat treating a stud element, having a rounded end thereon, for toughness; case hardening said rounded end, pressing said stud into assembly with a case hardened seat element, and lapping said seat element into a true bearing fit with a cooperating seat element.

11. The process of forming joints which comprises heat treating a stud element having a rounded end for toughness, case hardening said rounded end, pressing said stud through a case hardened seating element having a semi-spherical outside surface to permanently joint said stud with said seating element, pressing a case hardened seating element having an inside semi-spherical surface into permanent association with a housing, lapping the semi-spherical surfaces of said seating elements into true bearing relation, inserting a retaining member in said housing, and urging said retaining member by spring pressure against the rounded end of said stud to maintain the stud in assembled relation in the housing.

12. The process of forming joints which comprises pressing a seat element into a joint housing, pressing a stud member into a case hardened cooperating seat element and working said last mentioned case hardened seat element into true bearing relationship with the first mentioned seat element.

GEORGE H. HUFFERD.